Figure 1:
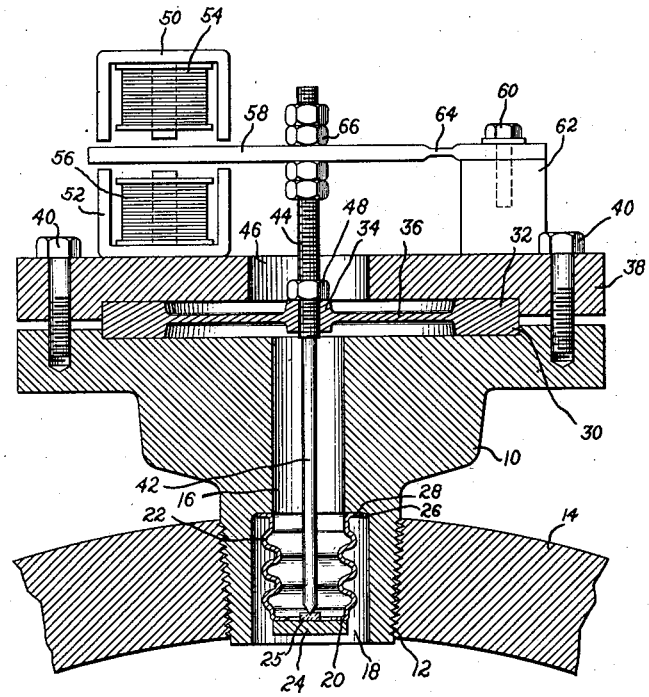

Oct. 28, 1941.  H. P. KUEHNI  2,260,837

PRESSURE MEASURING APPARATUS

Filed July 26, 1940

Inventor:
Hans P. Kuehni,
by Harry E. Dunham
His Attorney.

Patented Oct. 28, 1941

2,260,837

UNITED STATES PATENT OFFICE 2,260,837

PRESSURE MEASURING APPARATUS

Hans P. Kuehni, Schenectady, N. Y., assignor to General Electric Company, a corporation of New York Application July 26, 1940, Serial No. 347,711

2 Claims. (Cl. 177—351)

This invention relates to electrical apparatus for the measurement of pressures and more particularly to improved apparatus for measuring steady-state or transient fluid or gas pressures by electromagnetic means.

It is an object of my invention to provide a new and improved pressure measuring device adapted for the measurement of gaseous or liquid pressures of either steady or rapidly varying value.

It is another object of my invention to provide a new and improved pressure gage in which temperature effects of the liquid or gas whose pressure is to be measured are substantially eliminated from the measurement results.

It is a further object of my invention to provide an improved pressure measuring device which is of relatively simple construction and which may be built for comparatively low cost.

Other objects and advantages of my invention will become apparent as the description proceeds.

In carrying out my invention in its preferred form, I provide a gagehead having a highly flexible member which is positioned in a manner to seal an opening communicating with a chamber in which the pressure is to be measured. A pressure sensitive member in the form of an elastic or resilient member such as a diaphragm or beam is positioned in such a way as to oppose the force exerted on the highly flexible member and thus restrain the motion of the latter member. The highly flexible member is of negligible stiffness in the axial direction compared with the resilient member so that any unequal expansion in the gage parts is not transmitted as a force on the resilient member. In the preferred arrangement, the armature element of an electromagnetic gage is mounted in such a way that it is moved in accordance with the deflection or deformation of the pressure responsive member. I take advantage of the fact that variations in the air gap of a magnetic circuit cause a change in the reluctance of the circuit and by changing this air gap in response to and in proportion to the pressures under observation I am able to influence suitable instruments to indicate or record the pressures under observation.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawing in which Fig. 1 is a side elevational view in partial section of apparatus constructed in accordance with my invention, and Fig. 2 is a diagram of connections which shows a manner of connecting a portion of the apparatus of Fig. 1 in an electrical circuit for carrying out my invention.

Figure 2:
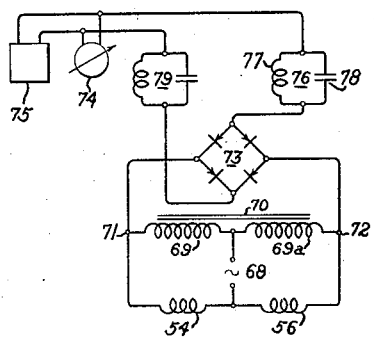

Referring to Fig. 1, I have shown a pressure gage constructed in accordance with my invention in which a body member 10 is provided with a threaded portion 12 which is adapted to be secured into the wall of a chamber 14 wherein measurements of pressure are desired. The body member 10 is further provided with a central opening having an upper portion 16 of reduced diameter and a lower portion 18 forming a member or recess of larger diameter which is substantially co-extensive with the threaded portion 12. Positioned within the lower chamber or recess 18 in communication with the pressure chamber 10 is a highly flexible member 20 in the form of a bellows comprising flexible or corrugated side walls 22 and a flat end portion 24 to which the force due to the pressure in the chamber 14 is applied. This end portion lies in a plane substantially normal to the direction of movement and conveniently may be referred to as the active pressure surface. The expansible member 20 is provided at its upper portion with an annular flange 26 which is secured in sealed relation to a shoulder 28 of the body member 10 by suitable means such as welding or soldering.

The flexible member 20 may be constructed of a suitable material such, for example, as phosphor-bronze or nickel depending on the temperatures encountered and the tendency of the liquid or gas to cause corrosion. I wish to point out that while I have shown the end portion 24 to which the active pressure is applied as being separate from the flexible or corrugated portion 22, these two elements may be originally made as one member instead of being made separate and integrally united by welding or the like. So far as the characteristics of the flexible member 20 are concerned, it should be highly flexible in the direction of its axial movement and relatively stiff in a direction transverse to this movement. I wish to point out in this connection that instead of employing a flexible member in the form of a bellows I may also employ a very thin disk-shaped flexible member in the form of a diaphragm.

Positioned in supported relation on the body member 10 is a main pressure-responsive resilient or elastic element 30 here shown as a diaphragm and which is adapted to withstand and act in opposition to the forces produced on the flexible member 20 by the liquid or gas in the pressure chamber 14. The diaphragm 30 is provided with a relatively thick outer annular portion 32 and a central portion 34 which are joined to each other by a comparatively thin intermediate portion 36. The annular portion 32 of the diaphragm 30 is rigidly clamped between the upper surface of the supporting member 10 and an annulus or disk 38 by means of a plurality of threaded bolts 40. A longitudinal member or push rod 42 serves to transmit the forces applied to the surface 24 of the flexible member 20 due to pressure variations in the chamber 14 to the central portion 34 of the diaphragm 30. The upper portion of the rod 42 is provided with a threaded portion 44 which passes through a central annular opening 46 in the annulus or disklike member 38, which threads engage the central or hub-like portion 34 of the diaphragm 30. A lock nut 48 serves to hold the push rod 42 firmly in position. To further reduce the transmission of heat through the push rod 42 to the main pressure sensitive member 30 from the active pressure surface 24, I prefer to insert a suitable heat insulating member 25 between the members 24 and 42 when the push rod is composed of a heat conducting material. However, the push rod itself may be composed of a heat insulating material, in which case the member 25 may be dispensed with.

I wish to point out that while I have shown the pressure responsive resilient or elastic element 30 in the form of a diaphragm it is not my intention to limit the invention in this respect as I may employ a resilient member in the form of a beam supported at both ends or of the cantilever construction, the beam preferably being formed integrally in the member 30 in a manner, for example, as described and claimed in my co-pending application Serial No. 318,683, filed February 13, 1940, entitled "Pressure measuring apparatus," and assigned to the assignee of the present application.

It is pointed out that it is the pressure responsive resilient member 30 which acts to restrain the motion of the push rod 42 due to forces produced on the active pressure surface 24 by the liquid or gas under observation. The member 30, being resilient or elastic, returns to its original position when the forces are removed. By means of the corrugated portion 22 the member 20 is made stiff in the transverse or diametrical direction but is highly flexible in the direction of axial movement. In other words, it is of such a construction that it has a negligible stiffness in the direction of axial movement as compared to the member 30. Thus the flexible member 20 acts as a sealing device without mechanically restraining the deformation of the main diaphragm. Thus if there are unequal temperature expansions between the push rod 42 and the member 10 due to hot gases or liquids in the chamber 14, the flexible member 20 will allow the differences of expansion to take place without producing a force on the resilient member 30.

In accordance with the illustrated embodiment, I have provided an electromagnetic gage for measuring the deflection, movement, or deformation of the resilient or elastic member 30 due to forces exerted on the flexible member 20 in accordance with pressure variations in the chamber 14. The gage comprises a pair of substantially E-shaped magnetic cores 50 and 52 on the central legs of which are positioned electrical coils or windings 54 and 56, respectively. The E-shaped core 52 may be suitably mounted on the annular member or disk 38 in any convenient manner, and the E-shaped core 50 is positioned with its open ends or legs in opposed and spaced relation to the open ends or legs of the core 52. Positioned intermediate the magnetic cores 50 and 52 and in cooperating relation therewith is a movable magnetic armature member 58 in the form of a cantilever beam which is mounted at its fixed end by means of a bolt 60 on a stud or supporting member 62 which projects from the disk or annulus 38. In the arrangement illustrated, the beam 58 is provided with a reduced cross-section or cut-away portion 64, about which deflection of the beam takes place, in order that the armature or beam shall have substantially no stiffness with respect to the main pressure-responsive member 30. The threaded portion 44 of the push rod 42 engages the magnetic armature at a point intermediate its support 64 and the gage coils for transmitting to the armature the deflection of the pressure sensitive member 30. A plurality of lock nuts 66 serve to adjust the position of the armature and to hold the members firmly in position. The magnetic cores 50 and 52 and the armature member 58 are preferably composed of high permeability magnetic material, and this material may be laminated depending upon the frequency of the electrical circuit in which the arrangement is to be operated.

In Fig. 2, I have shown an electrical circuit diagram of connections which may be conveniently employed for measuring variations of the reactance of the coils 54 and 56 in accordance with movement of the armature 58 due to pressure variations in the chamber 14. In the arrangement illustrated, a source of alternating current voltage 68 is arranged to energize a Wheatstone bridge circuit which comprises two differentially-connected electrical circuits, one of which comprises a section 69 of a differential reactor 70 or a transformer and the gage coil 54, and the other of which comprises a section 69a of the differential reactor and the gage coil 56. If desired, an adjustable tap may be provided on the balancing reactor to suitably balance the bridge circuit. Or if desired, an adjustable auxiliary impedance element may be connected in one or both of the differential circuits. However, it will be appreciated that the winding portion 69 and 69a are preferably made electrically similar so that with currents of equal magnitude and of the same phase relation flowing in the differential circuits, the voltage between the points 71 and 72 will be zero. The frequency of the source of supply 68 to be employed will depend upon the frequency of the pressure variations to be measured as will be understood by those skilled in the art. For example, when steady or slowly varying pressures are to be measured the source of supply 68 may be an ordinary commercial lighting circuit but for pressures which vary rapidly or for transient pressures a higher frequency supply such as 2000 cycles may be found to give more satisfactory results.

The conjugate portion of the Wheatstone bridge circuit, as represented by the points 71 and 72, is shown connected to the input terminals of a full-wave rectifier element 73, the output terminals of which may be connected to a direct current indicating instrument 74. If it is desired to record the pressure variations, a recording element such, for example, as an oscillograph

15 may also be connected to the output terminals of the rectifier 73.

I prefer to employ suitable means in the output circuit of the rectifier 73 for filtering out objectionable fundamental and harmonic frequencies emanating from the supply source 68 to prevent them from affecting the current responsive devices 74 and 75. For example, if the bridge is energized from a 2000 cycle source of supply, there will be a 4000 cycle frequency ripple in the output in the case where a full wave rectifier is used. Thus, I may employ a filter 76 comprising an inductance element 77 and a capacitor 78, with the elements tuned to resonate at the 4000 cycle frequency. As will be understood by those skilled in the art, in operation, the filter 76 presents a practically infinite impedance to the flow of currents having a frequency corresponding to its resonating frequency so that such currents will have no effects on the measurement results. Also, due to the imperfection of rectifiers such as 73 there may be objectionable 2000 cycle frequencies present and I may in such case employ an additional filter element 79, similar to the filter 76, with the elements tuned to resonate at 2000 cycles. Furthermore, it may be that objectionable harmonic frequencies are present in the source of supply 68. In such an event, I may employ still other means for filtering out these harmonics so that they will not appreciably affect the measurements results. The foregoing arrangement is described and claimed in my previously-referred-to co-pending application.

The magnitude of the potential of the supply source 68 is adjusted to the desired value and the air gaps between the cores 50 and 52 and the armature 58 are adjusted to give the desired sensitivity. The pressure gage may be calibrated in any well-known manner such, for example, as by connecting the pressure detector to a gage tester or to a reservoir or chamber, the static pressure of which can be measured.

Assuming that it is desired to measure the pressures in a chamber of any sort, the threaded end portion of the device is screwed into a threaded aperture in the chamber containing the gas or liquid the pressure of which is to be measured. The pressure of the liquid or gas in the chamber is in communication with the active pressure surface 24 of the flexible member 20 thereby exerting a force thereon which force is transmitted to the diaphragm 30. The resulting deformation or movement of the resilient member 30 causes a deflection of the magnetic armature 58. Increasing pressures produce an increase in the air gaps formed between the magnetic core 52 and the armature 58 and a decrease in the air gaps formed between the magnetic core 50 and the armature 58. As a result, the reactance of one of the gage coils is increased and that of the other is decreased and, since these coils are connected in adjacent arms of the bridge circuit, the current responsive devices 74 and 75 will respond with high sensitivity to movement of the armature. With proper calibration either a direct indication or a graphic record may be obtained in terms of pressure variations.

In order to more fully appreciate the advantages to be obtained in the use of a pressure measuring device of the character described, assume for example that the highly flexible element 20 is omitted and that hot gases or liquids in the pressure chamber act directly on the main diaphragm or pressure sensitive element 30. In such a case, if the liquid or gas whose pressure is to be measured is at a high temperature, the heat transmission through the upper section of the push rod 42 from the diaphragm 30 to the gage armature 58 and from the diaphragm to the gage coil supports tend to be unequal resulting in unequal expansion of these parts. Thus the armature 58 would move relative to the cores 50 and 52 due merely to temperature effects. Consequently, with such an arrangement, when high temperatures are encountered, it is difficult to prevent changes of the gage instrument reading due to these temperature effects.

By the employment of an auxiliary member such as the highly flexible element 20 which encloses the cooperating end of the push rod 42 and further by providing an insulating member 25 between the rod and bellows, the hot gases or liquids under observation do not act directly on the pressure restraining resilient member or diaphragm 30 but act on the flexible element or bellows 20 instead. Thus the high temperatures are kept away from the diaphragm 30 and from the rest of the upper structure of the gage head. Inasmuch as the main diaphragm 30 is comparatively stiff relative to the highly flexible member 20 the former is practically the sole means of restraint to motion in an axial direction of the active pressure surface 24. Consequently, any unequal or relative expansions between the push rod 42 and the member 10, which supports the main diaphragm and the flexible member 20, are allowed to take place without producing a force on the pressure responsive diaphragm 30, such unequal expansion being taken up by movement of the flexible member 20. As a result of the foregoing arrangement temperature effects are practically eliminated.

The arrangement has another distinct advantage in the case where carbon deposits or other floating particles are present in the liquid or gas the pressure of which is being investigated. In the case where piston type gages are employed, such particles often wedge themselves between the cylinder and the piston wall thereby tending to cause a sticking of the gage. Furthermore, in certain applications where corrosive gages or liquids are being investigated the cylinder and piston would tend to deteriorate. The same holds true in the case where the gases or liquids are in direct contact with the main diaphragm or pressure responsive element. The present arrangement largely overcomes these difficulties because of the fact that the flexible element 20 is sealed against the shoulder 28 of the member 10 and due to the simplicity of the member 20 it may be readily replaced with relatively small expense if corrosion occurs. It is further adaptable to be constructed for low cost in view of the fact that accurate machining operations necessary for producing close fits or tolerances are not required.

By the use of the flexible member 20 the temperature range of the gage can be materially increased and, with this construction, the apparatus of my invention may be applied generally to the measurement of pressure and it is particularly suitable for measuring the instantaneous or transient pressures which exist in explosion chambers and the like such, for example, as those produced in the oil chamber of a high capacity oil circuit breaker when the circuit is opened or in the combustion chambers of Diesel and other internal combustion engines. It will also be used to advantage for investigating steady-state or transient pressures existing in the cylinders of steam locomotives. By the employment of pressure sensitive resilient members 30 in the form of diaphragms or beams of different stiffness and flexible elements 20 having active pressure surfaces 24 of different areas the pressure range may readily be changed to meet the desired conditions of measurement.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. In a device responsive to pressure changes of relatively hot fluids, a relatively stiff resilient member adapted to undergo elastic deformation due to applied forces, a flexible member in the form of a bellows having an active pressure surface and adapted to be mounted in sealed relation over an opening of a pressure chamber and in communication with the gas or liquid the pressure variations of which are to be measured, said bellows being relatively stiff in the transverse direction and having negligible stiffness as compared to said resilient member in an axial direction, and a push rod positioned between said resilient member and said bellows for transmitting the forces applied to the active pressure surface of said bellows to said resilient member, said flexible bellows enclosing the cooperating end of said push rod so as to minimize the transfer of heat from the hot fluids to said push rod and said relatively stiff resilient member.

2. In pressure measuring apparatus for measuring pressure changes of relatively hot fluids, a resilient member, a highly flexible member supported in spaced relation with respect to said resilient member, said flexible member being adapted to be positioned with one side thereof in communication with a chamber subject to pressure variations, a rigid member positioned in engagement with said resilient member and said flexible member for transmitting forces to said resilient member in accordance with the forces exerted on said flexible member due to pressure variations in said chamber, said flexible member having negligible stiffness as compared to said resilient member, and heat insulating means between said rigid member and said flexible member, said flexible member enclosing the cooperating end of said push rod so as to minimize the transfer of heat from the hot fluids to said push rod and said resilient member.

HANS P. KUEHNI.